March 30, 1954
R. H. EBSWORTH
2,673,475
POWER TRANSMISSION
Filed Sept. 4, 1951
4 Sheets-Sheet 1
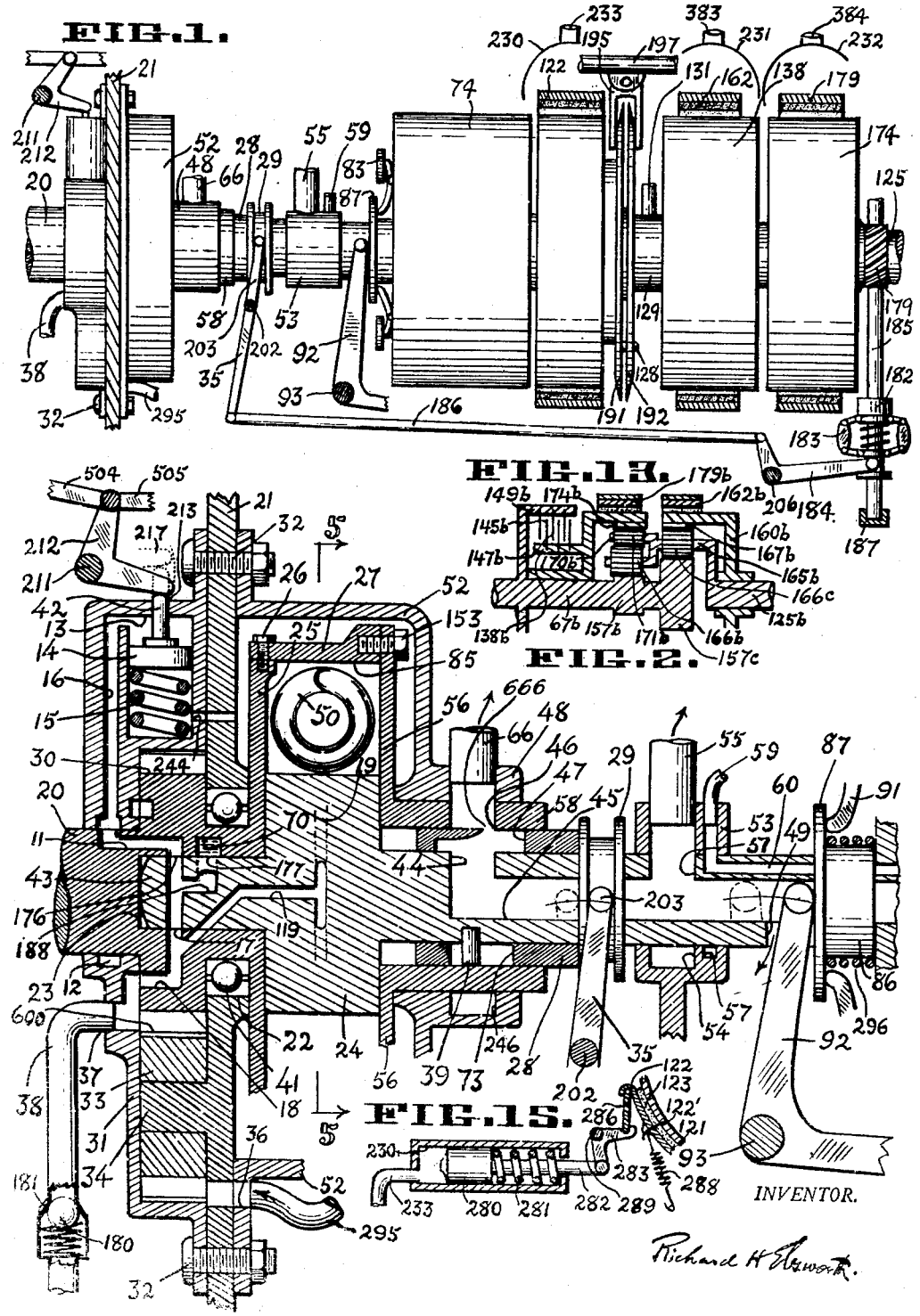
INVENTOR.
Richard H. Ebsworth March 30, 1954
R. H. EBSWORTH
2,673,475
POWER TRANSMISSION
Filed Sept. 4, 1951
4 Sheets-Sheet 2
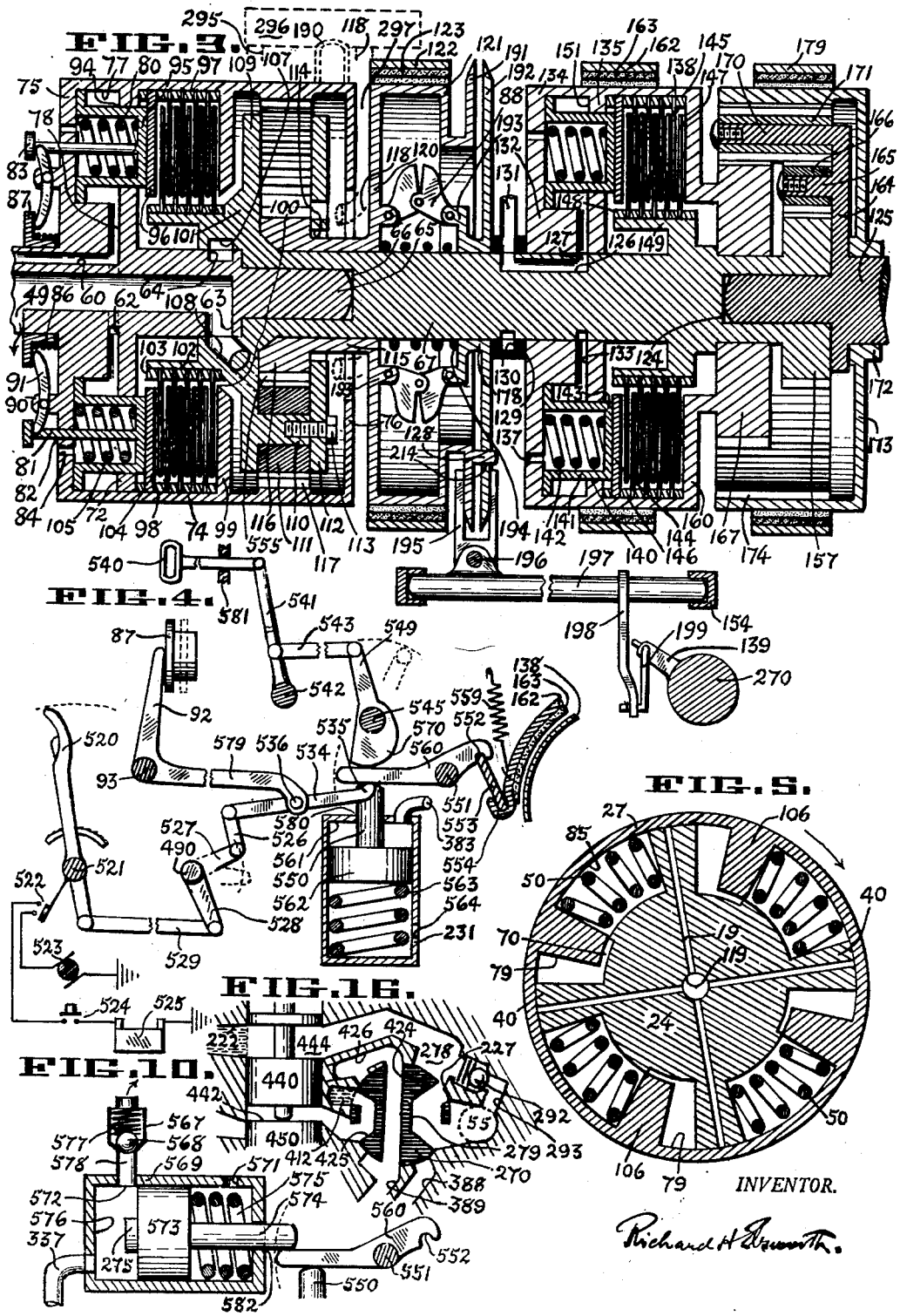
INVENTOR.
Richard H. Ebsworth.

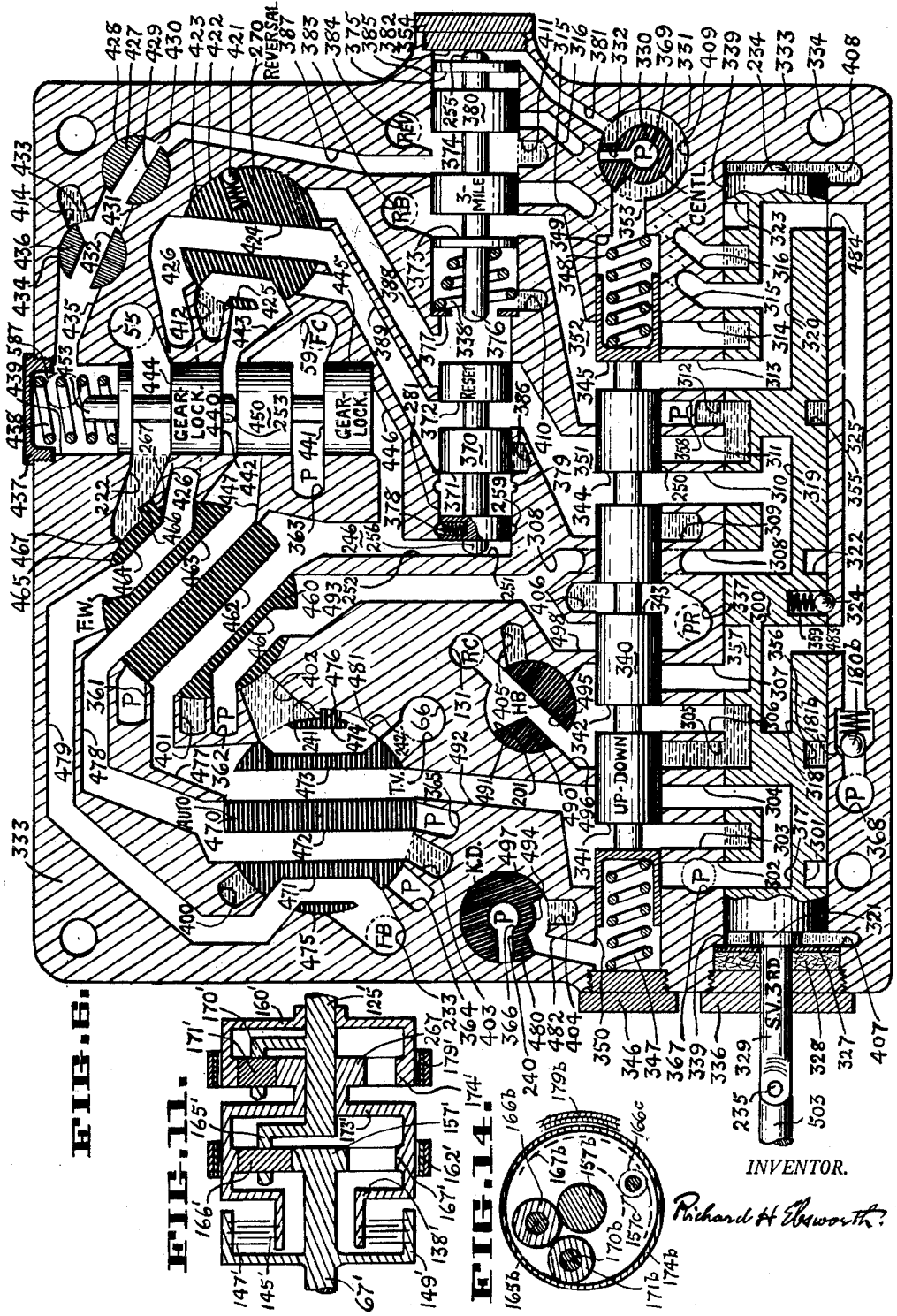

March 30, 1954 — R. H. EBSWORTH — 2,673,475
POWER TRANSMISSION
Filed Sept. 4, 1951 — 4 Sheets-Sheet 4

INVENTOR.
Richard H. Ebsworth.

Patented Mar. 30, 1954

2,673,475

UNITED STATES PATENT OFFICE 2,673,475

POWER TRANSMISSION

Richard Henry Ebsworth, Laguna Beach, Calif.

Application September 4, 1951, Serial No. 245,019

9 Claims. (Cl. 74—472)

This invention relates to power transmissions, more particularly in automobiles and of the kind wherein planetary gears are used to provide a number of gear ratios while the gears remain constantly in mesh, no gears being shifted, said planetary gears being arranged to furnish a flexible and easily controlled mechanism without the use of a fluid coupling or torque converter. It relates also to transmissions in which automatic mechanism serves to furnish an infinite range of gear ratio between the drive and the driven shafts.

The invention is a continuation in part in improvement upon my co-pending applications, Serial Nos. 148,227, filed March 7, 1950, and 204,000, filed January 2, 1951.

The present demonstration includes inventions of these prior applications, insofar as parts of the whole may be compared therewith, but represents new unitary combinations as outlined in the following specification.

These are the objects, advantages and features of the invention:

The preferred form of construction comprises a front planetary assembly, gears in which are enclosed to form a controllable pressure pump, a rear planetary assembly, front and rear brakes, front and rear clutches, a drive shaft, an intermediate shaft and a driven shaft.

The front clutch directly connects the drive shaft to the intermediate shaft while the rear clutch serves to connect the intermediate shaft to the driven shaft by locking the members of the rear planetary assembly. Both clutches are spring-biased to the engaged position in the normal condition.

The front brake is normally biased to the disengaged position by a spring and applied hydraulically to hold a gear member of the front planetary assembly stationary to act as a reaction gear. The rear brake is normally spring-biased to the applied position to hold a gear member of the rear planetary assembly stationary to act as a reaction gear and restrained from engagement by hydraulic pressure. Provision is also made for holding a gear member in the rear assembly stationary to furnish reverse drive.

Control means are provided for producing automatic change of gear ratio in response to the torque applied to the intermediate shaft which mechanism includes a pump and means to lessen the resistance to the discharge from said pump in step with an increase in the torque transmitted.

Gear members in the front planetary assembly are used to provide the resistance pump; said members being fitted with a casing and performing their pumping function without the use of any co-operating gears external to the said casing.

A simple set of valve control mechanisms which are easily serviced provide an efficient regulation of the various parts of the planetary transmission. In the preferred form these valves are grouped in an easily detachable block which may if desired be replaced by an entirely new unit. The manual control may be moved into any position, at any speed of the vehicle, without damage of any kind to the transmission. A smooth start with "clutch effect" is furnished in any gear setting and the change between first gear and reverse is a simple one not calling for special handling of the control by the operator.

An automatic change into high gear is provided when the speed of the vehicle exceeds a predetermined speed such as 50 M. P. H. Also a change-down is provided automatically from one gear ratio to the next lower gear ratio when the throttle is fully depressed at any speed below 50 M. P. H.

An electric switch in the circuit to the starter is provided which is closed when the hand brake is applied and broken when the same brake is released. This is an important safety factor since the said brake in the invention mechanically disengages the front clutch when applied and the engine can thus only be started when the said engine is in a condition of "free-wheeling" wherein the drive shaft is unable to transmit any appreciable degree of torque to the intermediate shaft.

The conventional clutch pedal is eliminated while providing that the accelerator pedal may furnish a free-wheeling condition of the engine when said throttle pedal is fully released. The important feature, that of constantly available free-wheeling, would not be present if an hydraulically operated automatic check mechanism, which will be described later in the specification, is included in the transmission. Simple means, however, such as a tap controlled by the operator, would suffice to render the said mechanism inoperative at any time and the ability to free-wheel under all conditions would be maintained. It is also arranged that said change-down and said free-wheeling are operative independently of any gear setting that may have been selected by the hand control. Between said fully released and fully depressed positions of the accelerator pedal the gear setting of the handle control is made effective and so in the free-wheel position of the pedal the gear may be preselected and will become operative when the throttle is depressed.

When the flow of fluid from the planetary pump described becomes increasingly restricted the rotation of the gears forming said pump becomes increasingly retarded and when closure of the outlet is complete the said gears become practically locked. This process will be referred to as "gear-locking." Gear-locking is employed to bring a drive shaft and a driven shaft to practically the same speed of rotation before clutching means which serves to connect the said shafts for unitary rotation becomes operative so that the wear and strain on said clutch is reduced to a minimum. Gear-locking is also used to check the rotation of the front brake drum and reversal of rotation of the drum is utilised to cause application of said brake at a moment when said drum is practically stationary so that wear and strain on said brake members is also reduced to a minimum.

A centrifugal mechanism, inoperative when the vehicle is in reverse, provides for special control when the speed is below 3 M. P. H. and for a further control when the speed exceeds 50 M. P. H.

Valve means for gear control is provided, which is not sensitive to the rough jarring of a heavy vehicle. This, combined with the saving of wear on brakes and clutches and freedom from unusual heat production render the transmission specially suitable for the demanding requirements of a military tank.

Other objects, advantages and features, include: Use of only two brakes for forward drive while at the same time one of the brake bands replaces that of the usual hand brake; a single pump suffices for the supply of fluid pressure where two are commonly used, and also, relief for that pump is provided in high gear to reduce the drag on the transmission; a positive neutral ensures "no creeping"; four fixed ratio gears are available for forward drive or for hill-braking; and because of the increased number of gears an unusually large engine is not called for, while the rear axle may be fitted with a higher ratio of drive; an automatic drive with infinite gear ratio in a high or low range is provided, with simple hand control; push start is possible at a very low speed and for towing the engine may be put in free-wheel; an automatic brake which is inescapably applied, no matter what the position of the controls, operates when pump pressure fails and the speed is below 3 M. P. H., no special "parking" position of said controls being required; a thermostatic control serving to regulate the speed of gear-locking in accordance with the viscosity of the contained oil; a high gear in which a direct drive is obtained without slip; a brake which is automatically applied when the control handle is placed in neutral and the speed of the car does not exceed 3 M. P. H.; simple controls which are not subject to seizure or mechanical failure and are not dependent on opposing fluid pressures acting simultaneously for their operation; provision for lock-out of reverse when the car is going forward at more than a predetermined low speed while the speed in reverse is not limited in any way; provision for the engagement of the rear clutch and rear brake while the front clutch and the front brake are still free and no torque is being transmitted; this early engagement saves the members of the rear unit from wear and strain; a hand brake which, while using a brake band and drum that also serve to provide a gear ratio for driving, acts in the conventional way in any gear setting that may be provided by the hand control; a transmission which does not call for special cooling because undue heating is not present; a transmission which does not need electric solenoids, or vacuum connections, or the commonly-used accumulator valve in the operation of the brakes and clutches therein; a transmission which does not use a specially sensitive governor and does not pass torque with the aid of a one-way detent such as a roller or ball mechanism of any kind; a gearbox in which all the necessary adjustments could be made from without; and a transmission in which the drive shaft is divided into two relatively movable spring-biased parts, said parts cooperating to furnish a torque-responsive valve which provides the control needed for an automatic drive.

The present invention is especially concerned with improvements in the controls required for a transmission such as the one which has just been described.

One object of the invention is to provide dashpots between the two parts of the divided drive shaft serving to prevent sudden relative movement between said parts while at the same time provision is made for a special valve which becomes actuated when the said relative movement occurs in the opposite direction of rotation, either when the engine ceases to fire or when it is being used as a brake, the torque being then transmitted forwardly from the said intermediate shaft to the said drive shaft.

Said special valve, when the engine is driving, is opened to supply pressure for the disengagement of a spring-biased stop mechanism which, while normally permitting the accelerator pedal to be released into the free-wheeling position, acts on the shutting off of pressure by said special valve, to move said pedal into the "throttle-just-opening" position in which free-wheeling is no longer operative.

Another object is to provide centrifugal mechanism in connection with the front brake drum for the actuation of a sliding disc associated with said drum, said mechanism permitting said disc to operate a "reversal" control for said brake when said rotating drum slows down and then rotates in the opposite direction. Said mechanism is spring-biased to normally urge said disc to contact with said reversal control.

A further object is to make the said torque-responsive valve which provides the automatic control, responsive also to variations in the speed of the vehicle, the range of action of said latter valve being varied by the movement of an apertured sliding collar which is actuated by a connection from the centrifugal mechanism operated by the driven shaft.

Still another object is to provide a simplified selector valve which serves to control the clutches and brakes in the four forward gears and in neutral and reverse, while the automatic drive is furnished by a special automatic valve which has its own hand control.

These and other features, objects and advantages will be apparent from the annexed specification in which:

Fig. 1 is an external over-all view of a transmission in a preferred form of the invention.

Fig. 2 is a vertical section of the left portion of Fig. 1.

Fig. 3 is a vertical section of the right portion of Fig. 1.

Fig. 4 is a schematic presentation of the connections and controls for the rear brake.

Fig. 5 is a cross section along the line 5—5 of Fig. 2.

Fig. 6 is a vertical section of a detachable plate or block serving to house the various valve controls.

Fig. 10 is a section of a power-relief mechanism shown in connection with the rear brake.

Fig. 11 is a diagrammatic section indicating an alternative form of construction of the rear planetary system shown in Fig. 3.

Figure 7:
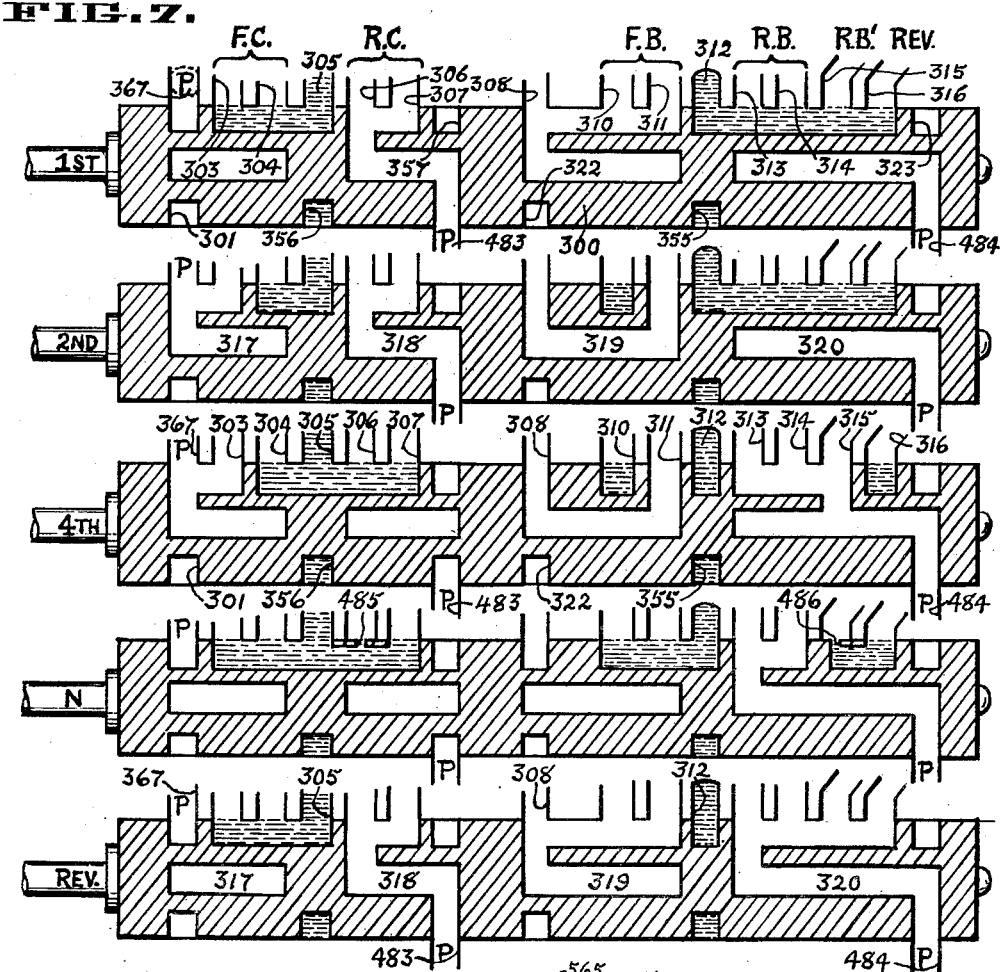
Fig. 7 is a series of sections of the selector valve 300 shown in Fig. 6 serving to indicate the various settings for the different gears and for neutral and reverse.

Figs. 13 and 14 indicate a further construction of the rear unit.

Fig. 15 shows a mechanism suitable for the front or reverse brake.

Fig. 16 shows a modified construction of the reversal valve 270 shown in Fig. 6.

Referring now more particularly to the drawings:

In Figs. 1 and 2 the power transmission of the invention is shown as including a drive shaft 20 which receives torque from the engine. A cross wall 21 forming part of the gear box wall is provided, the shaft 20 being supported in a bore 22 of the cross wall 21 by ball bearings 41 and provided with a re-entrant bore 23 adapted to receive the reduced end of the shaft 24. The shaft 20 is provided with an enlarged end or flange 25 to which there is secured, as by means of the studs 26, a casing 27 which houses a split shaft mechanism hereinafter described.

The shaft 20 is also provided with a gear 30 which is housed in a housing 31 secured to cross wall 21 by studs 32. The same housing contains a gear 33 mounted on a hub 34 carried by and forming a part of cross wall 21 which is apertured at 36 to pass oil to the gears 30 and 33. Housing 31 is apertured as at 37 to receive a conduit 38 which forms the main supply line for conveying oil under pressure to operate the various clutches, brakes and valves controlling the transmission, the assembly just described being the operating pressure pump of the transmission.

Shaft 24 is provided in the region of the casing 27 with lateral extensions 40 and, similarly, the casing 27 is provided with complementary inwardly extending members 106 (Fig. 5). Shaft 24 is fitted with a longitudinally extending bore 45 and a lateral bore 44. Coil springs 50 mounted in chambers 85 within casing 27 serve to transmit torque from shaft 20 to shaft 24, each spring having one end abutting against a protuberance 40 on shaft 24 and the other end against a protuberance 106 on casing 27. Chambers 79 and 85 act as dashpots to prevent undue fluctuations in the relative movement of shafts 20 and 24 when springs 50 are compressed. Casing 27 is enclosed by a casing 52 attached by studs 32 to cross wall 21 and a hub extension 48 of casing 52 embraces and supports a similar extension 58 of the rear wall 56 of casing 27.

Closely fitting between shaft 24 and collar extension 58 is a sliding collar-like member 28 apertured as at 47 and slotted in its length at 73 to closely receive a key 39 which serves to prevent any rotation of collar 28 on shaft 24. Collar 28 is fitted at its rear end with an enlarged slotted head 29 through which collar 28 is moved axially by lever arm 35 in accordance with the speed of the car as will be described. Specially shaped apertures 46 and 47 in collars 58 and 28 co-operate to form a valve the effective opening of which is varied as shaft 24 carrying collar 28 with it undergoes relative movement to shaft 20 and collar 58, in accordance with the amount of torque passing and the degree of compression of springs 50. The greater the torque the more the opening provided by the relative rotation of collars 58 and 28 but as car speed is increased the escape opening becomes proportionally reduced.

Said escape is from a planetary pump 555 (Fig. 3) which will be described, through bores 44 and 45, apertures 46 and 47, and tube 66, the latter being opened or closed by a valve 470 in the control block shown in Fig. 6. In the diagram in Fig. 8 rotatable sleeve 58 is shown fitted with aperture 47 and sliding collar 28, with aperture 46. The triangle 666 represents the actual opening of the torque valve. The assembly described above will be referred to as the "torque valve."

When the speed of shaft 24 exceeds that of shaft 20, which occurs when the engine ceases firing or the operator of the vehicle is using the engine as a brake, compression of springs 50 ceases and protuberances 40 and 106 come together, closing chambers 79, the rate of this movement being determined by the amount of flow allowed by the reduced areas 70 between dashpots 79 and 85. When the engine is started a valve 17 is opened to pass power through a permanently open port 176 through a bored conduit 11 and an annular slot 12 to a tube 16 and a cylinder 13 bored in casing 31, moving a piston 14 fitted with extension pin 42 against spring 15, to allow a lever arm 212, connected to pedal 510 (Fig. 9) and pivoted at 211 to have freedom. The opposite movement, wherein chambers 79 are closed with the abuttal of extensions 40 and 106 serves to shut valve port 17 and to open a port 177 formed between shafts 20 and 24 to allow cylinder 13 to drain through a permanent drain outlet 70 whereon piston pin 42 is moved upward by spring 15 to move lever arm 212 into throttle-just-open-position 217 (dotted). By suitably extending conduit 16 the cylinder 13 with piston 14 may be located in any other desired position such as that shown diagrammatically in Fig. 9. The assembly just described will be referred to as the "free-wheel check."

The divided shafts 20 and 24 with casings 27 and 74 and brake drum 121 collectively supply the lack of a flywheel, if the engine be not fitted with one, and may be made sufficiently robust for that purpose (see Fig. 3).

Shaft 24 is also provided with a lateral bore 51 opening to an annular groove 54 formed in a ring 53 which serves for the attachment of a conduit 55 which has permanent communication with bore 45 and for the attachment of a conduit 59 which is constantly open through annular groove 57 in ring 53 to longitudinal bore 60 which conveys power when needed for the disengagement of the front clutch. Shaft 24 is also provided with a bore 119 which conveys oil under pressure from conduit 18 through radial bores 19 for the lubrication of the torque valve assembly and serving also to keep the dashpots 79 and 85 from draining. Shaft 24 is also fitted with an escape orifice 49 which is uncovered by the application of the hand brake when it moves collar 87 to disengage the front clutch, spring 296 normally biasing collar 87 to close escape port 49.

Pressure conduit 38 may be fitted with a spring-biased ball or other similar valve 180 which while allowing free flow in one direction closes to restrict return flow to that permitted by a small permanent leak 181. This valve serves to prevent any sudden power reduction. Its use may be limited to the rear clutch and rear brake as shown at 180b in Fig. 6.

In Fig. 1 a worm gear 179 fixed to driven shaft 125 meshes with a worm gear (not shown) carried by a cross-shaft 185 serving to drive a centrifugal mechanism 183 through a one-way mechanism 182 which idles when the shaft 125 is reversing. The centrifugal mechanism 183 operates an angled lever 184, fulcrumed at 201, which in turn, actuates through a link 186, a lever 35 fulcrumed at 202, which, through its yoke 203, working in the slotted end of a sliding sleeve 28, serves to axially move sleeve 28 to the right as the speed of shaft 125 increases.

In Fig. 3 the numeral 74 generally indicates a housing with which are integral a clutch cross wall 72, a front wall 75, and a rear wall 76.

The front wall 75 is bored out as at 77 to form a cylinder and is provided with a lateral bore 78 communicating the annular groove 62 with cylinder 77.

In one practical form the device is provided with six similar cylinders 77 and six lateral bores 78, two of which are shown in Fig. 3. The cylinders 77 are fitted with pistons 80 which are hollow and are integral with shafts 81 which extend through bores 82 in the front wall 75. The outer ends of piston shafts 81 are enlarged to form collars 83. The wall 75 is provided with bores 84 for bleeding each of the cylinders 77. A sleeve 86 integral with an enlarged collar 87 is carried by shaft 24. Front wall 75 carries six brackets 90, each mounting a pivoted lever arm 91 having one end engaging one of the collars 83 and the other end which is appreciably longer, providing a mechanical advantage, contacts collar 87.

A yoke 92 is provided engaging the collar 87 and suitably pivoted on a cross shaft 93 for the moving of collar 87 to pivot lever arms 91 withdrawing pistons 80 to their full forward position to disengage the clutch which will be described. The operation of yoke 92 by the hand brake is shown in Fig. 4 (also Fig. 9).

The pistons 80 are reduced in diameter throughout the major portion of their length and the reduced portion is adapted to be received within a bore 94 in the clutch cross wall 72. The piston head 95 is adapted to engage a plate 96 forming a part of the clutch, said plate being annular and engaging each of the pistons 80. Plate 96 is externally splined and movably mounted in slots formed in a ring 97, which carries a series of lighter plates 98 to form with plate 96 the driving elements of the clutch. A fixed rear wall 99 having a circular opening 100 and integral with housing 74 completes the clutch.

The intermediate shaft 67 is fitted with an enlarged head 101 and a tubular extension 102. A ring 103 on extension 102 movably receives the inner clutch plates 104.

From the foregoing description, it will be apparent that fluid under pressure by conduit 59, longitudinal bore 60, and bore 78 will be communicated to cylinders 77, thus tending to force the pistons 80 to the limit of their forward movement. Coil springs 105 are provided on each of the piston shafts 81, having one end abutting the front wall 75 and the other end abutting the piston heads 95. Thus the clutch mechanism is spring applied and hydraulically disengaged by the above described mechanism.

The enlarged head 101 of the intermediate shaft 67 is provided with an annular groove 107 cooperating with the annular groove 64, and three bores 108, only one of which is shown in Fig. 3 communicate the passage formed by the grooves 64 and 107 to the outlets of a gear pump hereafter described.

The shaft 67 in the region of the enlarged head 101 is also provided with a collar 109 formed integrally therewith and constituting both a front pump wall and a planet carrier. The collar 109 is fitted with three bosses 110 constituting the bearings for a corresponding number of planet gears 111, and a rear pump wall 112 is provided, preferably secured to the bosses 110 by means of stud elements 113. The rear wall 112 is apertured as at 114 for the reception of shaft 115 carrying sun gear 116. The shaft 115 is hollow and revolves about the shaft 67, as shown. An annulus gear 117 is provided on the inner side of the housing 74 cooperating with the planets 111.

A sump is provided constituting the rear wall 76 and rear clutch wall 99 and any oil passing into the sump is forced towards the pump planets 111 by centrifugal action. The planetary pump must be constantly supplied to be efficient and oil may be carried inside wall 76 by a conduit 118 which connects to reservoir 296 splash-filled by scoops 199 which gather drainage at a low level.

The shaft 115 is provided with an integrally formed plate 120 carrying an outer casing 121 which forms a brake drum and ends in a tapered flange 191. A disc with tapered edge 192 is integral with a collar 178 carried on shaft 67 and is biased rearwardly by spring 194 which bears against plate 120. Hinged centrifugal weights 88 borne by supports 193 on plate 120 and disc 192 act to bring flange 191 and disc 192 together, compressing spring 194 and stopping any frictional pull by said flange and disc on a yoke 195 which is swung by pin 196 on a brake control rod 197. Rod 197 is rotatably mounted in supports 154 and is fitted with a swinging arm 198 which is connected by a link 199 to the actuating arm 139 of valve 270 (Fig. 6) the cross-shaft of which may conveniently be in a plane at right angles to that of shaft 197. The assembly described constitutes a controlling mechanism (for the operation of the front brake) which is freed by the action of the centrifugal weights 88 as long as the speed of rotation of drum 121 is enough to overcome the bias of spring 194. When the drum slows down spring 194 moves disc 192 away from flange 191 and the disc and flange become gripped tightly by the inner surfaces of yoke 195 which is rotated to abut against a suitable stop, the yoke 195 thereafter sliding on said disc and flange. When the drum stops rotating in the one direction and commences to rotate in the opposite direction yoke 195 and shaft 197 are swung through the complete range of movement which they are allowed by a suitable stop and valve 270 is rotated by link 199 into the second of its two operating positions. The valve 270 will be referred to as the "reversal valve" and its full operation will be described later.

In Fig. 3 for greater clearness the clutches and brakes are shown in the disengaged position. A brake band 122 with suitable lining 123 is provided for drum 121 and will be referred to as the front brake. A ring 129 with an annular groove 130 and supported on shaft 67 serves for the attachment of a conduit 131 which furnishes pressure and drainage in the actuation of the rear planetary clutch about to be described.

The central shaft 67 is provided with a reentrant bore 124 for receiving the front end of the driven shaft 125. Shaft 67 also has a longitudinal bore 126 and a lateral bore 127 through which pressure is passed from conduit 131 through an annular groove 130 to a plurality of lateral bores 133 and cylinders 151 formed in casing member 138. The brake band 162 will be referred to as the rear brake.

Said casing 138 which is supported rotatably on shaft 67 functions externally as a brake drum for the rear brake and houses within it the rear clutch. Integral with casing 138 is a front wall 134, a central clutch wall 135 and a rear clutch wall 160 which is extended to carry a sun gear 167 which provides the reaction needed for a low ratio drive.

The central clutch wall 135 is apertured as at 140 to receive the reduced end of a piston 141. As before, preferably six pistons 141 are provided. These are hollow and contain a coil spring 142. The piston heads 143 engage the heavy movable plate 144 of the clutch under the bias of the springs 142. Outer clutch plates 145 are again splined in ring 146 and inner clutch plates 147 are splined in ring 148, which ring is mounted on a tubular extension 149 of shaft 67. It will be apparent from the above described mechanism that the rear clutch is applied by springs 142 and disengaged by pressure from conduit 131.

The driven shaft 125 is provided with a plate-like extension 164 which has a plurality of studs 165 extending forwardly to carry a first series of planet gears 166 and a set of studs 170 which carry a second series of planet gears 171 which mesh internally with the first series of planets 166 and externally with an annulus gear 174. Preferably there are three planets in each of said series.

A bearing member 172 is provided on shaft 125 and carries a plate 173 which mounts the annulus gear 174 the outer surface of which acts as a brake drum for a brake 179 which is used for reverse drive. The brake member 179 will be referred to as the reverse brake.

At its rear end shaft 67 has a driving sun 157 which drives the first series of planets and rotatably supports a sun gear 167 which meshes with the second series of planets which are prolonged for that purpose, said sun gear 167 being integral with casing 138.

The operation of the above described device is as follows:

*First gear.*—The front clutch is disengaged by pressure supplied to cylinders 77 through conduits 59, 60 and 78. The rear clutch is disengaged by pressure supplied to cylinders 151 through conduits 131, 126 and 133. The front brake 122 is applied through controls to be described to hold drum 121 and front sun 116 stationary. The engine drive then passes through shafts 20 and 24 to annulus gear 117, and planet gears 111, providing an approximately 1.5 to 1 ratio of drive. The rear sun gear 157 rotates the first series of planets 166 backwardly and the second series 171 forwardly to wind said second series forwardly on the teeth of the reaction sun gear 167 which is held stationary by rear brake 162. The forward movement of the second series on sun gear 167 carries forward extensions 170 and 165 integral with the driven shaft 125. A suitable ratio for this rear planetary drive would be 2.5 to 1, the two planetary sets thus furnishing a first gear ratio of 3.75 to 1. For clearness planets 171 have been shown long and planets 166 short. In practice the opposite arrangement would be more satisfactory.

*Second gear.*—The front brake is allowed to be taken off by a spring while the front clutch becomes applied by the action of springs 105, conduits 59, 60 and 78 draining cylinders 77. The rear brake is applied and the rear clutch is disengaged as described under "First gear."

*Third gear.*—The front brake is applied, the front clutch freed by hydraulic pressure to cylinders 77. The rear brake is held off by hydraulic pressure as will be described later and the rear clutch is engaged by springs 142 acting when cylinders 151 are drained.

*Fourth gear.*—Both brakes 122 and 162 are free. Both clutches are engaged, the front one directly connecting the drive shaft 24 to the intermediate shaft 67, the rear clutch locking the sun gear 167 to shaft 67 so that the two series of rear planets become locked and in turn lock shaft 67 to driven shaft 125 for unitary rotation.

For reverse drive the annulus gear member 174 which rotated idly in first and second gears is held stationary by reverse brake band 179 while clutch casing 138 is rotated idly. Planets 166 are rotated backwardly, planets 171 forwardly winding back on the gear 174 taking with them studs 170 and driven shaft 125.

Referring now more particularly to Fig. 11 there is shown diagrammatically an alternative embodiment of the rear planetary and clutch mechanisms described in connection with Fig. 3. With this construction, in low gear drive, shaft 67' rotates sun gear 157' forwardly and planet gears 166' backwardly, winding the latter gears forwardly on annulus gear 167' which is held stationary by the application of brake 162' to casing 173'. Planet hubs 165' carry driven shaft 125' forward. Planet gears 171' and annulus gear 174' are rotated idly.

In reverse, brake band 179' holds annulus gear 174' stationary and shaft 67' rotates forwardly, planet gears 166' backwardly, and carrying annulus gear 167' backwardly and with it the sun gear 267. Planet gears 171' are rotated forwardly, to wind planet gear hubs 170' and driven shaft 125' backwardly, on the annulus gear 174' with which said gears mesh.

In direct drive with this unit clutch 145'—147' locks shaft 67' to annulus-carrying casing 173' and the rear planetary system becomes locked for unitary rotation.

Referring again to Figs. 1 and 2, the torque and speed responsive valve described therein is indicated generally by the numeral 666 and the enclosed planetary gear resistance pump by the numeral 555 in Fig. 3.

Figures 8, 9:
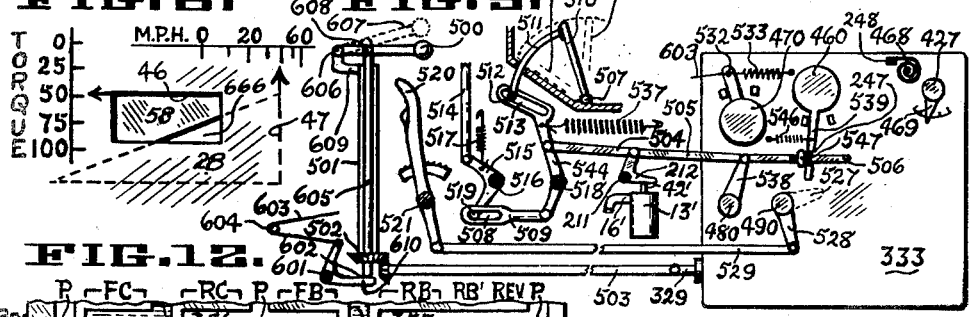
Fig. 8 is a diagram showing the apertures co-operating to form the torque-responsive valve shown in Fig. 2.
Fig. 9 is a schematic presentation of the various hand and foot controls in their connection with the valves shown in Fig. 6.

In connection with the torque-responsive valve described in Fig. 2, Fig. 8 is a diagram showing the interaction of rotary sleeve 58, provided with aperture 47, with the laterally sliding collar 28, provided with aperture 46. As the aperture 47 is moved to the right axially away from the aperture 46 with increasing speed of the vehicle the escape opening represented by the triangle 666 becomes lessened. As the springs 50 are increasingly compressed with the passing of greater torque shafts 26 and 24 undergo relative rotation and sleeve 58, integral with shaft 20, brings its aperture 47 into closer relationship with the aperture 46 of sliding collar 28. So that, with increase of vehicle speed or less passage of torque, the escape opening 666 becomes lessened and it enlarges if the car slows or torque increases.

Controls suitable for the aforesaid transmission will now be described, with particular reference to Figs. 4, 6, and 9. The operator of the vehicle would be provided with:

(1) A hand control lever 500, most conveniently placed on the steering post, and capable of being located in six positions—high gear, 3rd, 2nd, 1st, neutral and reverse.

(2) An accelerator pedal, 510.

(3) A hand brake, 520.

(4) A rarely-used hand lever or pedal for mechanically camming off the rear brake when the engine is dead and a push start or towing is needed, 540.

In Fig. 6 is shown a block 333 attached by bolts at 334 to the side of the transmission box and serving to house the valve controls of the hydraulic system. The hydraulic connections between the transmission as shown in Fig. 1 and valve-housing block 333 include:

(1) A power conduit 38 conveying operating pressure for the various hydraulic controls.

(2) Escape conduits 55 and 66 regulating the clutching action of the planetary resistance pump 555.

(3) Conduits 59 and 131 serving for the operation of the front and rear clutches respectively.

(4) Conduits 233, 363 and 384, serving for the operation of the front and rear brakes and the reverse brake band respectively.

(5) A conduit 337 in connection with the rear brake mechanism for the relief of pressure in the power system when the speed of the car exceeds 50 M. P. H.

Figure 12:
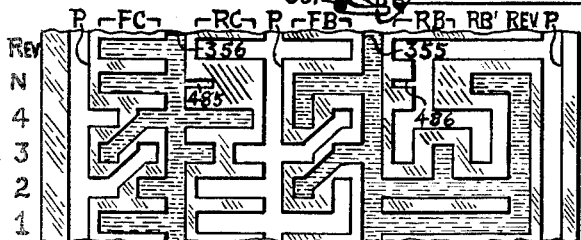
Fig. 12 is a plane projection showing diagrammatically a construction of selector valve 300 shown in Figs. 6 and 7 wherein superficial slots only are used for both power and drainage.

In the drawings and especially in Figs. 6, 7, and 12, abbreviations are used as follows:

P. indicates a conduit or chamber which is constantly open to pressure from power conduit 38. K. D. indicates "kick-down." P. R. indicates a conduit or chamber concerned with power relief. F. B., front brake. F. C., front clutch. R. B., rear brake. R. C., rear clutch. Rev., reverse. T. V., torque-responsive valve. G. L. V., gear-lock valve. F. W., free-wheel. Auto, automatic. S. V., selector valve. H. B., hand brake. Centl., centrifugal.

Horizontal "fluid" shading lines indicate a chamber or conduit which is freely open to permanent drainage.

A horizontally positioned cylinder 339 in block 333 houses a rotary piston valve 300 which will be referred to as the "selector" valve, having a handle 329 hinged at 235 to rod 503 which through bevel gears 502 is actuated by hollow shaft 501 from the operator's handle 500. Selector valve 300 may be rotated into six positions as shown in Figs. 7 and 12. It is located at one end by a knob 234 and at the other by a shoulder 321 which bears against a plate 327 held in place by an oil seal 328 and plug 336 screwed into block 333. The indication "3rd" shows that the valve 300 is in position for third gear drive. Starting from the left end valve 300 is fitted with internal bores 317, 318, 319 and 320. Fig. 12 indicates a construction in which these bores are replaced by superficial slots.

Parallel with valve 300 is a spring-biased valve 340 reciprocating in a cylinder 250 bored in block 333.

Valves 300 and 340 are connected for normal gear setting by conduits 303, 306, 310 and 313, and for a kick-down gear change, which will be described later, by conduits 304, 307, 311 and 314.

Valve 300 is also connected with a valve 380 by conduits 315 and 316 for rear brake and reverse control above and below 3 M. P. H. as will be described.

Bore 317 is concerned only with front clutch operation and opens constantly to an annular groove 301 and conduit 302 to receive pressure from a power conduit 367 communicating with the pump conduit 38.

Valve 300 is fitted with six of these annular grooves. Three of them open respectively to the power conduits 367, 483 and 484. These grooves are 301, 357, and 323 (Fig. 7). Two grooves 355 and 356 open to recesses 312 and 305 for permaent drainage. The last of the grooves 322 opens constantly to a conduit 308 and a conduit 493 to be given power or drainage according to the setting of the free-wheel valve 460. Valve 300 is also provided with a spring-biased ball 324 in a slot 359 serving to hold the valve in its different settings. Bore 317 is open to conduit 303 in 2nd and high gear and to conduit 304 in 3rd gear ready for the kick-down change to 2nd.

Bore 318 is concerned with rear clutch operation only and receives power through groove 357 from conduit 483. It is open to conduits 306 and 307 in 1st and 2nd gears and in reverse. There is no kick-down change involved because the rear clutch must remain disengaged by pressure in all three of these gears.

Bore 319 through groove 322 is constantly open to a conduit 308 connecting it with free-wheel valve 460 and is opened to conduit 310 in 1st, 3rd and reverse gears, and to conduit 311 in 1st and reverse because these remain unchanged, and in 2nd and 4th ready for kick-down.

Bore 320 is open constantly through conduits 484 and 325 to power line 368. This connection may be protected from a sudden fall in pressure from any cause, such as a broken power line, by a spring-biased ball 180b which on closure allows only a restricted leak 181b to be operative, ensuring a slow application of the rear brake. If needed, the rear brake can at any time be cammed off by the use of handle 540.

Bore 320 is concerned only with the operation of the rear band and the reverse band and opens to conduit 313 in 3rd and 4th gears, neutral and reverse. For kick-down change, it opens to conduit 314 in 4th and reverse. It opens to conduit 315, which becomes operative below 3 M. P. H. for 3rd, 4th and reverse. It opens to conduit 316 for the application of the reverse band.

Conduits 303 and 304 are front clutch controls, 306 and 307 rear clutch controls, 310 and 311 front brake controls and 313, 314 and 315 serve in the operation of the rear brake, 315 being used only to provide a rear brake control in neutral that comes into action when the car is stopping at an intersection and the speed falls below 3 M. P. H.

Conduits 303, 306, 310 and 313 are operative in the normal gear settings of the selector valve 300 and conduits 304, 307, 311 and 314 come into action when valve 340 moves to the right to furnish a kick-down gear change.

Selector valve 300 is also fitted with superficial slots which provide drainage as follows:

Conduit 303 opens to the drain 305 in 1st and 3rd gears.
Conduit 304 opens to the drain 305 in 1st, 2nd and 4th.
Conduit 306 opens to the drain 305 in 3rd, 4th and neutral.
Conduit 307 opens to the drain 305 in 4th.
Conduit 310 opens to the drain 312 in 2nd, 4th and neutral.
Conduit 311 opens to the drain 312 in 3rd.
Conduits 313, 314, 315 open to the drain 312 in 1st and 2nd.
Conduit 315 opens to the drain 312 in neutral.

Drains 407 and 408 prevent the building up of any end pressure against valve 300.

Adjacent to valve 300 in block 333 a cylinder 250 houses a valve 340 which takes the form of an elongated slotted piston biased to a normal central position by springs 347 and 348 located in chambers 350 and 349 which form the ends of cylinder 250. Chamber 350 is closed by a plug 346 screwed into block 333.

Valve 340 is fitted with the annular reduced portions which form slots 341, 342, 343, 344 and 345.

A cylindrical bore 331 in block 333 houses a cross shaft 330 provided with a central power bore 369 opening to a radial bore 332 and integral with or in alignment and coupled with the shaft 206 which carries the lever arm 184 of the centrifugal mechanism 183 (Fig. 1). Below 3 M. P. H. shaft 330 is in its "low" position in which bore 332 opens to a conduit 381 to operate to the left a valve 380 which will be described. With increasing speed of the car valve 330 is rotated anti-clockwise and at 50 M. P. H. bore 332 opens pressure to chamber 349 through conduit 353, serving to actuate valve 340 to the left against spring 347 to provide an automatic change "up" to high gear.

In this high gear setting of valve 340 the slots 341, 342, 344 and 345 open to power line 367, drain 305, drain 309 and power line 358 respectively, selector valve 300 being by-passed, no matter what its setting may be. A power relief line 337 (Fig. 10) is opened through slot 343 and conduits 498 and 499 to a bore 461 and power line 362 in the free-wheel valve 460 to be described later. At the same time valve 340 shuts off conduit 482 to make a kick-down change inoperative. When valve 340 returns to its central position the power relief line 337 opens through slot 343 to drain 406. Between 3 and 50 M. P. H. reduced area 409 of valve 330 which is open to free drainage releases pressure from chambers 349 and 382.

A cylinder 497 bored in block 333 houses a cross shaft 480 fitted with a reduced portion 494, an axial power bore 366 and a radial bore 240 opening therefrom.

Shaft 480 carries an arm 538 on the exterior of block 333 which is actuated anti-clockwise by accelerator pedal 510 when it is moved to the kick-down position 565. In this position bore 240 passes pressure through conduit 482 to chamber 350 to move valve 340 to the right and slots 341, 342, 344 and 345 register respectively with conduits 304, 307, 311 and 314. Selector valve 300 in this position provides a gear setting next lower than that in use when valve 340 is centered. The kick-down change applies in 4th, 3rd and 2nd gears. Valve 340 will be referred to as the "up-down" valve.

A cylindrical bore 491 in block 333 houses a cross shaft 490 which is integral on the exterior of the block 333 with an arm 528 which through link 529 is operated by the hand brake 520 which is fulcrumed at 521 (Fig. 4). Valve 490 is fitted with a transverse bore 495 having a dilated end 201 and in its normal setting opens a rear clutch conduit 131 through recess 496, slot 342 and conduit 306 to selector valve 300. When the hand brake is applied shaft 490 is rotated clockwise closing off recess 496 and opening line 131 to drain 405. This assures the engagement of the rear clutch at all times when the hand brake is applied.

A cylindrical bore 475 in block 333 houses a cross shaft 470 fitted with transverse bores 471, 472, 473 and 474. Shaft 470 forms a valve serving by its rotation for a change from normal drive to automatic drive. It may be conveniently actuated through an external arm 532 biased by spring 533, by means of a handle 500, operating the rod 605, a lever arm 610 fulcrumed at 601, and wire 603 which reverses its direction of action by means of pulley 604 (Fig. 9). In the normal drive position which is shown in Fig. 6 a shoulder 476 integral with shaft 450 abuts against the end 241 of a slot 242 and bore 471 opens a conduit 233 from the front brake operating mechanism (Fig. 15) to a conduit 479 connected with the free-wheel valve 460. Bore 472 opens a conduit 478 from valve 460 to the drain 403. Bore 473 opens a conduit 477 from valve 450 to conduit 492 connected with valve 340. When wire 603 is released valve 470 is rotated clockwise until shoulder 476 abuts against the end 481 of slot 242. In this new position automatic drive is established and bore 471 opens F. B. line 233 to the drain 400 to release the front brake. Bore 472 opens power line 364 to conduit 478, bore 463, recess 447, slot 441 and F. C. line 59 serving to disengage by pressure the front clutch when valve 450, which will be described, moves upward. Bore 473 becomes closed off from conduit 492 from the selector valve and opens power line 365 to conduit 477, bore 462, conduit 246 and conduit 446 to move valves 450 and 440 upward against spring 438, as will be described, to gradually close off line 55 connected with the resistance pump 555. Bore 474 opens the torque valve line 66 to the drain 402. The front clutch is now disengaged by pressure, the front brake freed by drainage and resistance pump 555 allowed escape only through line 66 said escape varying with the torque and speed settings of the torque valve 666. An infinite number of gear ratios are operative between the drive shaft 20 and the intermediate shaft in automatic drive. When the torque valve 666 is completely closed the two latter said shafts attain practically unitary rotation. On the other hand, the greater the escape flow allowed from the planetary resistance pump 555 as valve 666 is more widely opened, the faster the speed of the drive shaft 20 becomes relatively to that of the intermediate shaft 67 and the lower the gear ratio set up between these said shafts. The automatic drive may be established in either of two ratios, high and low, according to the settings of the rear brake and rear clutch by selector valve 300.

A cylindrical cross bore 465 in block 333 serves for the housing of a shaft 460, forming the freewheel valve, and to which is fixed, externally of block 333, an arm 539, biased by spring 546 and bored at 247 to permit passage of a link 506 fitted with adjustable nut 547. Shaft 460 is fitted with transverse bores 461, 462, 463 and 464. When the throttle pedal 510 is released to the F. W. position 566, dotted in Fig. 9, lever 544 through links 504, 505 and 506 moves nut 547 to contact arm 539, rotating shaft 460 anti-clockwise against the bias of spring 546, until a shoulder 466 on shaft 460 rests against the wall 467 of the drain chamber 222. Bore 461 now opens conduit 493 to drain 402, bore 462 opens conduits 246 and 446 to drain 401 causing valves 440 and 450 to be moved downward by spring 438, so that the front clutch is disengaged by pressure through conduit 59 and slot 441 by power line 363 regardless of the setting of selector valve 300. The resistance pump 555 is allowed free escape through line 55 and slot 444 to drain 222. Bore 463 is inactive.

Bore 464 opens the front brake line 233 through bore 471 and conduit 479 to the drain 222 and the front brake is disengaged by its spring regardless of the setting of the selector valve 300.

In this free-wheel position the gear as set by the selector valve 300 may be pre-selected and it does not become operative until the shaft 460 is rotated into the drive position as shown in Fig. 6. In the drive position of valve 460 bore 461 supplies pressure from power line 362 to conduit 493 which connects with the selector valve, bore 462 opens conduit 477 to conduit 246 connecting with gearlock valve 450 and reset valve 370. Bore 464 opens line 426 from the 270 "reversal" valve, to be described, to conduit 479 connecting with the front brake line 233.

This movement of valve 460 into the "drive" position thus acts as a trigger to render the setting, that has been given for the front brake and front clutch by the selector valve, operative. The rear brake and rear clutch are operated directly by the selector valve and are not affected by this change in valve 460.

The disengagement of the front clutch and front brake with free escape from resistance pump 555 might be more correctly termed "declutching" than "free-wheeling" since it serves to take the place of a conventional clutch or a fluid coupling. It is preferred construction however to allow the rear brake and rear clutch to remain in the setting given them by the selector valve though it will be evident to those skilled in the art that connections could be provided for the simultaneous freeing of both clutches and both brakes to more nearly furnish a perfect condition of free-wheeling.

A vertically positioned cylindrical bore 445 in block 333 serves to house a duplex valve formed by a piston 440, which is concerned with the control of the front brake and the resistance pump, and a second piston 450 which controls the operation of the front clutch. Both pistons are biased downwardly by a spring 438. Piston 440 is fitted with an upper pin 453 to limit its upward travel, an annular slot 444, and a lower pin 253 which serves to maintain a chamber 442 between the two pistons 440 and 450. In a start in 1st or 3rd gear or reverse, said chamber 442 receives pressure from a conduit 443 for the upward actuation of piston 440 in the engagement of the front brake, piston valve 450 remaining unmoved.

Valve 450 is fitted with a slot 441 which normally conveys pressure from a power line 363 to conduit 59 serving to keep the front clutch disengaged.

The upper end of cylinder 445 forms a dashpot chamber 439 having an outlet conduit 435 with escapes to drains 411 and 414. Said escapes determine the rate of upward movement allowed valve 440. Chamber 439 houses spring 438 and is closed by a plug 437 screwed into block 333. A conduit 55 from the resistance pump 555 is normally open through slot 444 to drainage recess 222. Upward movement of valve 440 gradually closes off slot 444 until at a certain stage of this closure valve 270, which will be described later and referred to as the "reversal" valve, is suddenly rotated in a clockwise direction by shaft 191 (Fig. 3) when the front brake drum reverses its direction of rotation to turn forwardly with the engine. The front brake is at once applied by power from line 362 through bore 461, conduits 493 and 308, bore 319, conduit 310, slot 344, conduit 351, slot 372, conduit 389, bore 424, conduit 426, bore 464, conduit 479, bore 471 and conduit 233, acting on piston 280. At the same moment the reversal valve 270 opens chamber 442 to drain 412 through conduit 443 and bore 425 serving to cause the immediate downward return to its normal position of valve 440 under the pressure of spring 438, thus re-opening the resistance pump 555 to drain 222. The power supply to the conduit 443 through bore 425 for the operation of piston 440 came through the series of connections just described which join power line 362 to conduit 389.

Valve 450 normally disengages the front clutch by pressure from power line 363 through slot 441 to the front clutch line 59 and through bores 60 and 78 to cylinders 77.

When valve 450 is actuated upwardly for the engagement of the front clutch in 2nd or high gear, the power comes from the power line 367 through conduit 302, bore 317, conduit 303, slot 341, conduit 492, bore 473, conduit 477, bore 462, conduit 246 to recess 446 at the lower end of cylinder 445. This upward movement carries with it valve 440 which slowly closes off the flow through line 55 from the resistance pump 555. As the gearlock becomes complete front clutch line 59 is opened to drain 403 through slot 441, recess 447, bore 463, conduit 478, and bore 472, springs 105 applying the front clutch.

When valve 450 is moved up in automatic drive, line 55 is again closed off but line 59 is opened by the automatic valve 470 to the power line 364 so that the front clutch remains disengaged.

Valve block 333 is bored transversely to form a cylinder serving to house a short cross shaft 436 which is bored as at 432 and constantly opens dashpot 439 through conduit 431 and 435 to a second cross shaft 427 bored as at 429 and housed in a cylinder 428. These two cross shafts provide adjustable escapes which regulate the flow from dashpot 439 and serve to control the speed of upward movement of valve 440.

Bore 432 opens through a variably restricted opening 433 to a drain 414 and valve 436 may be manually adjustable, or as shown in Fig. 9, be automatically varied by a thermostatic element 468 attached to a bracket 248, the opening 433 being increased as the weather becomes colder and the viscosity of the oil increases. Restricted opening 433 offers the only escape from dashpot 439 at starting but when the speed of the car exceeds 3 M. P. H. valve 427 furnishes a second opening 430 which is adjustable by the setting of an external arm 469 (Fig. 9). Said opening 430 allows an additional escape for dashpot 439 through conduit 387 and slot 374 to the drain 411.

For rapid re-filling dashpot 439 may be connected by a one-way conduit 587 (dotted) with reservoir 296 shown in Fig. 3. Said reservoir 296 (dotted) serves to provide a steady supply of oil to the power pump, indicated generally by the numeral 600 in Fig. 2, and to the resistance pump 555, through conduits 295 and 118, and is itself kept filled by splash from scoops 190 which collect the oil from the sump of the gearbox. Space 297 would be made wide enough to permit the introduction of conduit 118.

Block 333 is transversely bored through to form a cylinder 422 which serves to house a cross shaft valve 270 provided within the gearbox with an actuating arm 139 (Fig. 3) which through a link 199 is hinged to an arm 198 carried by shaft 197 rotatable in supports 154. When the engine starts the brake drum 121 is rotated backwardly and valve 270 is rotated anti-clockwise until a spring-biased ball 421 registers with a notch 423 in the wall of cylinder 422. In this position it communicates the front brake line 426 through a bore 424 to conduit 388 and chamber 442 through conduit 443 and bore 425 to conduit 389. Valve 270, which will be referred to as the "reversal" valve, is now set for the application of the front brake. When the free-wheel valve 460 is rotated clockwise into the "throttle-opening" position power is turned into chamber 442 to operate valve 440. When sufficient gearlock occurs the front brake drum reverses its direction of rotation and reversal valve 270 is rotated clockwise to turn on power to the front brake mechanism (Fig. 15) from conduit 389 whereas it previously received drainage through conduit 388 to drain 410. As before described, valve 440 is rapidly returned to its down position by the opening of chamber 442 to drain 412. The process of reversal described may be called "starting reversal" since it only occurs at starting when the front brake drum is rotating backwardly. Once the car is in motion the front brake drum is either stationary, in first or third gear, or turning forwardly at engine speed in 2nd or high gear, and the next time reversal occurs it will be a "backward" one, and will be referred to as "late reversal." The valve which will now be described, the "re-set" valve 370, is moved to the right when the engagement of the front clutch occurs shutting off the conduit 389 and "setting" conduit 388 for the next backward reversal.

Block 333 is fitted with a cylindrical bore 281 which serves to house reset valve 370, which is a piston fitted with annular slots 371 and 372, an end pin 256 and a spring-biased detent ball 378. At starting, valve 380 is moved to the left by pressure in chamber 382, the speed of the car being below 3 M. P. H. and pin 376 moves reset valve 370 to the left until end pin 256 abuts against the wall of end chamber 251. Ball 378 drops into notch 259 and holds valve 370 in that position until the front clutch is engaged by pressure in recess 446 for 2nd or top gear, or automatic drive is established by valve 470. The said pressure in chamber 251 through conduit 252 moves reset valve 370 to the right until it again contacts pin 376 and ball 378 drops into detent notch 379. If now, in 2nd or top gear, the speed falls below 3 M. P. H. the pressure in chamber 382 is balanced by the pressure in chamber 251 aided by the bias of spring 338 and valve 370 remains held by notch 379. Said balance moves valve 370 to the right when starting in 2nd gear.

In Fig. 6 the controls are shown as with the car after a start in 3rd gear and at a speed over 3 M. P. H. freewheel valve 460 being in the slightly-opened throttle position and automatic valve 470 being in the normal drive position.

Block 333 is bored to form a cylinder 385 which houses the "3-mile valve" 380, which is a piston fitted with end pins 376 and 255 and slots 373, 374, 375. It is biased by spring 338 which bears against a ring 377 fitted in the inner end of cylinder 385 the diameter of which is slightly greater than that of cylinder 281 with which it is aligned. This increase in diameter is needed for the placing of ring 377 but must not be enough to offset the bias of spring 338 when chambers 251 and 382 are pressured at the same moment. Cylinder 385 is closed by plug 354 screwed into block 333.

At starting and up to a speed of 3 M. P. H. centrifugal valve 330 pressures chamber 382 to move valve 380 to the left, pin 376 taking reset valve 370 along with it. In this starting position valve 380 shuts off dashpot conduit 387 from drain 411, opens conduit 316 through slot 375 to reverse line 384, and opens conduit 315 through slot 374 to rear brake line 383.

Over 3 M. P. H. valve 380 opens reverse line 384 and dashpot line 387 through slot 374 to drain 411, and shuts off line 315 which is operative to engage the rear brake by drainage when the selector valve is placed in neutral. At the same time line 352 is opened through slot 373 to line 383 to pressure the rear brake from normal spring engagement in 3rd and 4th gears.

The action of the various valves will again be dealt with later under "General operation."

A series of sections of the selector valve 300 is shown in Fig. 7 indicating the power and drainage connections needed for 1st, 2nd, and 4th gears, neutral and reverse. 3rd gear is shown in Fig. 6. The restricted ports 485 and 486 in neutral serve to prevent too rapid engagement of the rear clutch and rear brake when slowing down to below 3 m. at an intersection. The rear brake is spring applied and its action is not required until the car is nearly stopped. Fig. 12 is a diagrammatic plane projection of the surface of the selector valve constructed without internal bores and supplying both power and drainage through inter-communicating superficial slots.

Referring more particularly to Fig. 4 in which the rear brake connections are shown. Shaft 499 is fitted with an external arm 528, operated through a link 529 by the hand brake 520, and with an internal arm 527 connected by a hinged link 526 to a lever 534 which through its end 535 serves to actuate a lever 560 for the application of the rear brake. Lever 560, fulcrumed at 551, is fitted with a notch 552 bears against forked rod 553 which in turn bears against the rolled end 554 of rear brake band 162, fitted with a lining 163. Band 162 is normally retracted by spring 559.

Lever 534 is hinged towards its centre at 536 to the end of a lever 579, fulcrumed at 93, and serves at its other yoke end 92 to operate collar 87 for the disengagement of the front clutch.

A cylinder 231 fitted with a bored end 580 and having a leak 564 at its other end serves to house a piston 562 which has an extension pin 550 closely fitting in bore 580 and bearing at its end against lever 560. Piston 562 is normally biased by spring 563 to apply the rear brake 162 through lever 560 and is restrained from so doing by pressure in chamber 561 from conduit 383. Cylinder 231 is indicated diagrammatically in Fig. 1.

To disengage the rear brake when the car is to be towed, or pushed for a start with a dead engine, a cam 570, fulcrumed at 545 is rotated by its actuating arm 549, through link 543 and lever 541, fulcrumed at 542, by a handle 540 which may be conveniently supported by dashboard 581.

The hand brake 520, when applied, also serves to close a switch 522 which then makes the usual starter switch 524 operative to convey current from battery 525 to the starter motor 523. Herein resides a safety feature, in that the engine cannot be started until the hand brake is applied to (1) close switch 522 and (2) disengage the front clutch mechanically through collar 87.

In Fig. 10 is shown a hydraulic mechanism which is operated to ease the work of the power pump 600 and so to lessen the drag on the transmission when the car in top gear exceeds a speed of 50 M. P. H. A cylinder 569 houses a piston 573 fitted with pins 574 and 275 and biased by spring 575. A conduit 337, marked P. R. in Fig. 6, opens power from pressure line 362, through bore 461 in the F. W. valve 460, conduits 493 and 498, and slot 343 in "up-down" valve 340, to chamber 576 forming the end of cylinder 569. This occurs when valve 340 is moved to the left by pressure in chamber 349 when the car speed exceeds 50 M. P. H.

The pressure in chamber 576 moves piston 573 to compress spring 575. Pin 574 is moved through bore 582 and into the path of lever 560 to prevent the application of brake band 162. Piston 573 at the same time uncovers port 572 which leads through conduit 578 to a low pressure escape valve 567 closed by ball 568 biased by a light spring 577. A leak 571 allows piston 573 free movement. When valve 340 returns to its normal position, centered by opposing springs 347 and 348, conduit 337 is opened again through slot 343 to drain 406 and then piston 573 becomes actuated back again by spring 575 to its normal position wherein pin 275 abuts against the end wall of cylinder 569 and pin 574 no longer obstructs the action of brake lever arm 560.

Referring now to Fig. 15, therein is shown a mechanism for the application of the front brake which is also suitable for the operation of the reverse brake band.

A cylinder 230 houses a piston 280, fitted with extension pin 282, and biased normally to the disengaged position by spring 281. Pin 282 is hinged to a lever 283, fulcrumed at 289, which through a link 286, serves for the application of the brake band 122, with lining 123, to brake drum 121.

When cylinder 230 is provided with drainage through conduit 233 the spring 281 moves piston 280 to rotate lever 283 to disengage the brake which is retracted by spring 288 attached to a bracket 122' integral with band 122. Hydraulic pressure through conduit 233 actuates piston 280 for brake application, said conduit being shown connected with the automatic valve 470 in Fig. 6. Cylinder 230 and a similar cylinder 232 for the reverse brake band actuation are shown diagrammatically in Fig. 1.

The connections used by the operator to control the valves in block 333 are indicated in Fig. 9.

A handle 500 rotates selector valve 300 through shaft 501, bevel gears 502 and shaft 503, hinged to end pin 329.

Handle 500 serves to operate the external arm 532 of automatic valve 470, biased to the automatic position by spring 533. Handle 500 may be hinged at 606 to a bracket 609 carried by hollow shaft 501. A rod 605 hinged to handle 500 at 608 may be lifted by raising handle 500 to the automatic position 607 (dotted) allowing a lever arm 610, bearing against the lower end 602 of rod 605, to actuate a wire 603. Said wire wound around pulley 604 to reverse its direction of action would be connected to arm 532.

Hand brake 520, fulcrumed at 521, operates a rod 529 to rotate valve 490 through its external arm 528.

A throttle pedal 510, fulcrumed at 507, is shown in the "drive" position, and its extreme positions of "free-wheel" and "kick-down" are shown dotted at 566 and 565 respectively. Pedal 510, through a curved arm 511, operates through its pin 512, working in slot 513, a lever 544 fulcrumed at 518 and biased towards the free-wheel position by spring 537. Lever 544 operates through a link 509, fitted with a slot 508, a pin 519 carried by a lever 515 fulcrumed at 516, which is connected to the throttle by rod 514, and biased to the closed throttle position by spring 517. Slot 508 permits free movement of pedal 510 into the free-wheel position and link 509 does not influence lever 515 until the pedal is moved into the "throttle-just-opening" position shown.

Lever 544 is connected through three links, hinged to one another, 504, 505 and 506, to free-wheel valve 460. The first link, 504, is also hinged to lever 212, which was described in connection with the free-wheel check mechanism in Fig. 2. The second link, 505, is also hinged to arm 538 of the kick-down valve 480. The third link, 506, is fitted with an adjustable nut 547 and projects through an aperture 247 in the operating arm 539 of valve 460 which is biased by spring 546 to make constant contact with nut 547.

Adjustments for the dashpot escape valves 436 and 427 are shown. The valve 436, providing the only escape available when the car is starting, is operated by a bi-metallic thermostat coil attached to a block bracket 248. Valve 427 is positioned manually by setting its arm 469 in an indicator formed on the surface of block 333.

Referring now more particularly to Figs. 13 and 14. Therein is shown still a further method of construction of the rear planetary system as indicated in Figs. 3 and 11. Diagrammatically shown, a drive shaft 67b carries a ring 149b for the support of the driving clutch plates 147b and is integral with a central drive sun 157b serving for reverse drive and a sun 157c providing forward drive.

Sun 157b drives a first series of planet gears 166b which mesh with a second series of planet gears 171b which in turn mesh with a reaction gear forming an annulus 174b which is held stationary by the reverse brake band 179b. Said planet gears are supported by carrier 165b which is directly connected to the driven shaft 125b. For forward drive sun 157c meshes with planet gears 166c which in turn mesh with a reaction gear forming an annulus 167b which is held stationary by low brake band 162b. Planets 166c are carried by carrier 165b directly connected to the driven shaft 125b.

Direct drive is provided when annulus 174b is locked to sun 157b by the clutching of driving plates 147b carried in ring 149b with driven plates 145b carried in ring 138b.

Fig. 14 is a diagrammatic section wherein the carriers 165b and 171b are shown offset to one another to reduce the diameter of the annulus 174b. An advantage in the construction lies in the fact that only 5 gears are transmitting torque in forward drive but, on the other hand more gears are required in the planetary assembly.

Referring more particularly to Fig. 16, therein is shown a modified construction wherein the reversal valve 270 of Fig. 6 is fitted with a third bore 279 which operates to connect pump escape line 55 through a bore 278 to slot 444 of the gearlock valve 440. Its special action will be described under "General operation" later.

GENERAL OPERATION

Engine at rest:

"Automatic brake" is in operation, the front clutch, rear clutch and rear brake are all spring-applied. The engine, transmission and drive wheels are locked together.

The engine cannot be started and the car is held stationary.

To start the engine:

(1) Apply the hand brake, to (a) mechanically disconnect the front clutch through collar 87. (b) Close switch 522 so that switch 524 is made operable. (c) To mechanically apply the rear brake.

(2) Place handle 500 in neutral.

(3) Press the starter switch 524 and motor 523 starts the engine.

With the engine running in neutral:

(a) Power pump 600 develops pressure throughout the hydraulic system and free-wheel check piston 14 is moved downwardly against spring 15 by pressure in cylinder 13 through 16, 11, 176, 17 and 18 from pump 600, and (b) Throttle pedal 510 is free to be retracted to the free-wheel position 566 by spring 537, and so rotating the free-wheel valve 460 anti-clockwise.

(c) Front brake drum discs 191 and 192 rotating backwardly operate through 195, 197, 198, 199 and 139 to turn reversal valve 270 anti-clockwise.

(d) 3-mile valve 380 and re-set valve 370 are moved to the left by pressure in chamber 382 from 369 through 381 and 332.

(e) Up-down valve 340 is centered by springs 347 and 348.

(f) Gearlock valves 440 and 450 are down, biased by spring 438.

(g) Rear brake 162 is on, cylinder 561 being drained by the selector valve through 383, 374 and 315.

(h) Reverse is inoperative, cylinder 232 being drained through 384, 375 and 316.

(i) Now, the hand brake may be released, and front clutch remains disengaged by pressure in cylinders 77 from 363 through 78, 60, 59 and 441. Resistance pump escape 49 becomes closed, but 555 is still freely open to the drain 222 through 108, 107, 63, 45, 51, 55, and 444. Rear clutch valve 490 becomes rotated anti-clockwise and the rear clutch remains engaged, cylinders 151 being drained by the selector valve through 133, 126, 131, 495, 342 and 306.

To start the car:

*In first gear.*—Both brakes must be on and both clutches off.

(1) Automatic valve 470 must be rotated anti-clockwise for "normal" drive by lowering handle 500.

(2) Turn handle 500 to put the selector valve in 1st gear setting. Rear brake remains on but the rear clutch is disengaged by pressure in cylinders 151 from 368 through 325, 483, 318, 306, 342, 495, 131, 126 and 133, leaving the car free to move.

(3) Depress the throttle. Free-wheel valve 460 is rotated clockwise by spring 546 and acting like a "trigger" energises a line from 362 through 461, 493, 308, 319, 310, 344, 351, 372, and 389 to the reversal valve 270. Reversal valve having been turned anti-clockwise by the front brake drum, power now passes from 389 through 425 and 443 to 442 and gearlock valve 440 is moved upwardly closing escape 55, the rate of movement being slow because only aperture 433 is open to the dashpot 439. As 55 becomes closed off the pumping action of the front planetary gears forming pump 555 becomes increasingly resisted and planet carrier 101 and the intermediate shaft 67 are rotated at an increasing speed until the brake drum 121, driven backwardly by the front sun 116 is checked and begins to rotate in the opposite direction. With the first revolution in the same direction as the engine the brake drum discs 191 and 192, which are prevented from rotation relatively to one another by pins 128 fitting closely in bores 214, are gripped tightly by prongs 195 and reversal valve 270 is rapidly turned clockwise. Power is now opened from 389 through 424, 426, 464, 479, 471 and 233 to brake cylinder 230, the front brake being immediately applied at a moment when drum 121 is almost stationary. At the same time the reversal valve opens gearlock chamber 442 through 443 and 425 to the drain 412 and valve 440, having served its purpose in the closing of line 55, is at once returned by spring 438 to its original downward position. With both clutches "off" and both brakes "on" the car is now driving in first gear at a speed depending on the opening of the throttle.

*Operation of pump 555.*—When the vehicle is stationary the intermediate shaft 67 and the front planet-gear carrier 110 are held from rotation, the rear brake and rear clutch being both engaged. With the engine running, the front ring gear 117 is rotated forwardly by the engine shaft 20 to which it is connected and revolves the front planet gears 111 forwardly on the stationary carrier 110 thus imparting backward rotation to the front sun gear 116 and the front brake drum 121 to which said front sun gear is connected. As the flow from the planetary pump 555 becomes increasingly restricted relative rotation between the sun gear 116 and the planet gears 111 which co-operate to form the pump 555, is resisted. When the rear brake 162 is released and the vehicle is free to move, the front carrier 110 receiving torque from the drive shaft commences forward rotation. The faster the carrier 110 is rotated, the slower becomes the backward rotation of the sun gear 116 and the brake drum 121. When the flow from the resistance pump 555 is completely stopped the front planetary assembly rotates as a unit and the sun gear 116 and the brake drum 121 are rotating forwardly at the same speed as the engine. At a point intermediate between said backward and said forward rotation the brake drum is momentarily stationary. With the first movement of rotation in either direction the brake drum operates the reversal valve 270 and if the gear setting of the transmission is for 1st or 3rd gear the front brake 122—123 is immediately applied.

Reversal in 2nd or 4th gear is not of moment because the hydraulic connections through the reversal valve are not set for front brake engagement. In the operation of pump 555 for F. C. engagement the gearlock valve 440 in its upward movement closes the escape from the pump conduit 55 and, as the closure becomes practically completed, the accompanying upward movement of gearlock valve 450 serves to open escape from the F. C. line 59 through 441, 447, 463, 478, 472 and 403. Thus the F. C. which is engaged by spring 105 comes into operation when the front planetary assembly has arrived at unitary rotation.

Start in second gear:

In 2nd gear the rear brake and the front clutch are engaged and the front brake and rear clutch are free. The engagement of the R. B. and freeing of the R. C. occur as described in a start in 1st gear.

Valve 380 is moved to the left, taking with it the re-set valve 370, when the engine commences running, but when the free-wheel valve 460 is moved into the drive position pressure is turned on from 367 through 302, 317, 303, 341, 492, 473, 477, 462, and 246, to 251 and 446.

Power in 251 moves the valves 370 and 380 to the right again. Power in 446 moves gearlock valves 240 and 250 upwardly closing escape line 55. When sufficient closure of line 55 occurs, the check on the resistance pump 555 causes reversal of valve 270 and front brake line 233, which was at first drained by 222, now receives drainage through 389 to 386.

When full closure of escape line 55 occurs the front clutch line 59 receives drainage through 441, 447, 463, 478, 472 and 403 to become engaged under the pressure of springs 105.

Start in third gear:

Front brake and rear clutch are "on." F. C. and R. B. are "off."

In a third gear start the application of the front brake is as just described for 1st gear. In the pre-selection by the selector valve the front clutch is disengaged by pressure and the rear clutch spring-engaged by drainage from cylinders 151 to the drain in the selector valve. The rear brake has also been taken off by pressure in cylinder 561 through 383, 374, 315, 320, 484, and 325 from 368. The car moves off as gearlock closure of line 55 begins and is in full 3rd gear when starting reversal occurs.

Start in high gear:

In high gear both clutches are engaged and both brakes "off."

In the pre-selection the rear clutch is drained to go "on" and the rear brake is disengaged by pressure. The engagement of the front clutch and the disengagement of the front brake are as just described for a start in 3rd gear.

Change from 1st to 2nd:

Car is driving in 1st gear. Now, turn the selector into 2nd.

(a) The rear brake and rear clutch remain unchanged.

(b) Pressure at once passes from 367 through 303, 341, 492, 473, 477, 462, 246 to 256 and 446 to operate valves 370 and 450.

(c) Re-set valve 370 is at once moved to the right, even if the speed is below 3 M. P. H.

(d) The front brake goes "off," drained from 233 through 471, 479, 464, 426, 424, 389, and 371 to 386. The F. B. drum rotates backwardly for a moment causing the reversal valve 270 to rotate anti-clockwise. F. B. drainage however continues through 388, 372, 351, 344 and 310 to the selector valve.

(e) Gearlock valves 450 and 440 are moved upwardly by pressure in 446 and close escape 55 to give the clutch effect. Then, the cylinders 77 become drained through 59, 441, 447, 463, 478, and 472 to 403, and the front clutch is engaged.

(f) As escape 55 is closed the reversal valve 270 is again rotated, this time clockwise, but the F. B. remains drained through 389, 371 and 386.

Change from 2nd to 3rd:

(a) In 2nd the F. C. and the R. B. are "on." In 3rd the F. B. and R. C. go "on," so all four mechanisms undergo change.

(b) Rear unit.—The R. C. is at once put "on" by drainage from 131 through 495, 496, 342, 341 and 303. The R. B. is at once disengaged by pressure from 320 through 313, 345, 352, 373, and 383 to cylinder 231.

(c) Front unit.—Recess 446 is drained by the selector valve through 246, 462, 477, 473, 492, 341 and 303. Gearlock valves 450 and 440 are at once moved downwardly and the "front clutch" is disengaged by pressure from 363 through 441 to 59 and cylinders 77. The engine is free and tends to accelerate, the shaft 67 to lose speed, and the F. B. drum slows rapidly and then rotates backwardly, the "front brake" going "on" by power from 362 through 461, 493, 308, 319, 310, 344, 351, 372, 388, 424, 426, 464, 479, and 471 to 233.

Change from 3rd to high gear:

In 3rd the R. C. and the R. B. are "off" and remain unchanged.

Power is turned on by the selector valve from 367 to 446. Valves 440 and 450 are moved "up," closing escape 55 to provide the necessary clutch effect and then the front clutch becomes engaged by drainage from 59 through 441, 447, 463, 478, and 472 to 403.

The front brake which was "on" is at first drained from 233 through 471, 479, 464, 426, 424, 388, 372, 351, 344 and 310, to be taken "off." Then, when the front clutch becomes engaged and the front brake drum is rotating as a unit with the engine, the drainage goes through 389, 371 and 386.

Other changes are on the lines already described. A change from 2nd or 4th into 1st or 3rd, i. e. from a condition in which the R. B. drum is rotating as a unit with the engine to one in which it is stationary is treated in the change from 2nd to 3rd.

*Special features of the various valves, with further details.—*

*Automatic valve 470.—*This valve is operated clockwise when the spring 533 is allowed free action by the raising of handle 500 with consequent rotation of lever arm 610.

With valve 470 in automatic drive:

(a) The front brake is drained from 233 through 471 to 400 regardless of the setting of any of the other valves.

(b) If free-wheeling, the valves 440 and 450 are down and the F. C. is "off" by pressure from 361 through 441 to 59. Then, when F. W. valve 460 is again turned into the "drive" position by depressing the throttle, valves 440 and 450 are moved upwardly again by pressure in 445 from 365 through 473, 477, 462 and 246, closing escape 55. The front clutch however remains disengaged by pressure from 364 through 472, 478, 403, 447, and 441.

(c) The escape 66 for the "torque valve" is widely open but if the throttle is not opened too much, valve 666 provides only a small aperture, if any, for pump escape, and the closure of line 55 supplies the necessary clutch effect. The degree of said aperture opening depends largely on the strength of springs 50.

(d) If the handle 500 is also rotated to the high gear setting then "high automatic drive" is in operation, with the rear clutch engaged and the rear brake disengaged. Rotating the handle into 3rd gear would not be desirable because if the throttle were opened enough to give kickdown then the up-down valve 340 would provide a 2nd gear setting and the drive would go into "low" automatic, the R. B. being put "on" and the R. C. taken "off."

(e) "Low automatic drive" is provided if the handle 500 is turned into the 2nd or 1st gear setting.

(f) In "reverse" the ratio of automatic drive is about the same as automatic "low" depending on the construction of the gears.

(g) With heavy torque, such as pulling out of sand, the automatic "low" drive may provide, if springs 50 are not too heavy, a much lower gear ratio than the normal 1st gear. The same holds for reverse. For starting, automatic low is preferred unless the strain is very light. The centrifugal control tends towards opening the escape 666 more widely when the car is starting. It will be noted that the F. B. and F. C. are both free in automatic drive as well as in free-wheel, but they are never at any time engaged together. The R. C. and R. B. are, of course, engaged at the same time when the automatic brake is in action.

*Free-wheel valve 460* is operated anti-clockwise by spring 537 acting through nut 547 and against light spring 548 when the throttle pedal 510 is released to the position 566. It is positioned by a suitable stop such as shoulder 466 abutting against wall 467.

In this F. W. position:

(a) The F. B. is disengaged by drainage through 464 to 222, no matter what the setting of the reversal and other valves.

(b) Gearlock valves 450 and 440 are moved downwardly by drainage of 446 through 246, 412 and 401. Bore 463 is inoperative, as is bore 461. The F. C. is disengaged by power from 363 through 441 and 59. "Pump escape" 55 is full "open" to the drain 222 through 444.

In the "drive position," shoulder 466 abutting against wall 267:

(a) Bore 464 connects 426 and 479 for F. B. operation.

(b) Bore 463 connects 447 and 478 for F. C. operation.

(c) Bore 462 connects 246 and 477 for gearlock operation.

(d) Bore 461 connects 493 and 362 for F. B. operation and for power relief when the speed is over 50 M. P. H.

Thus the use of F. W. disengages the F. B. and the F. C. and opens wide the escape for the resistance pump 555, and the engine is running free. It would seem preferable to allow the rear unit, whatever the setting of the R. B. and R. C. to remain unchanged. The stops 476 and 466 shown with valves 470 and 460 could be replaced by check shoulders on the exterior of block 333 as indicated in Fig. 9.

*Gearlock valves 440 and 450.*—The actual gear-locking member is valve 440, serving to close the escape line 55 from the resistance pump 555, and operated upwardly against spring 438 and the restriction of flow from dashpot 439 presented by the adjustable apertures 433 and 436.

(a) Gearlock valve 440 acts independently, pressured upwardly by power in chamber 442, for a start in 1st or 3rd gear, or reverse.

(b) It is operated upwardly by gearlock valve 450, pressured by power in chamber 446, at any time the F. C. is engaged for 2nd or high.

(c) Valve 440 is moved downwardly at once by spring 438 when the reversal valve 270 opens the chamber 442 to the drain 412 through 443 and 425. Dashpot 439 re-fills easily through a one-way conduit 587 connected with a suitably placed reservoir such as is indicated by 296 in Fig. 3.

(d) Both gearlock valves are at once returned downwardly by drainage of chamber 446 when the F. C. is disengaged by free-wheeling or a change into 1st or 3rd gear or into automatic drive. In a change from 4th or 2nd into 1st or 3rd, however, although slot 444 is opened widely for escape from pump 555, if the construction shown in Fig. 16 is used, slight gearlocking is provided by the restricted aperture 227, aided if desired, by a spring-biased valve 292, which provides a one-way flow through conduit 293 connecting line 55 with 222 through 278 and 444. This restriction becomes operative whenever the F. B. drum is rotating with the engine as in 2nd and 4th gear.

(e) Although the selector valve 300 turns on power for F. C. operation in 2nd and 4th, this is used to actuate the gearlock valve 450 and the F. C. is engaged by "drainage" through 441 and 447, 463, 478, 472 and the drain 364.

Normally the F. C. is disengaged by power from 363 to 59. Gearlocking not only takes up the torque transmission in a way that produces a perfect clutch effect but the actual engagement of the clutch members with one another and of the brake band with the brake drum is performed when there is so little relative movement between the co-operating parts that wear and strain is practically non-existent. As the putting "on" of the F. B. or F. C. takes an appreciable time the R. B. or R. C. goes "on" when the engine is free and there is no transfer of torque through the rear unit.

*"Free-wheel check" mechanism.*—This mechanism has two objects:

(1) To maintain the pressure from the power pump if the engine should cease firing.

(2) To hold the throttle pedal out of the F. W. position if the engine is being used as a brake and thereby to make the driving easier for the operator.

The divided shafts 20 and 24, when the engine is transmitting torque, tend to undergo relative "forward" displacement, the springs 50 being more or less compressed. If the engine ceases firing, however, or the operator releases the throttle pedal, the shafts 20 and 24 undergo relative "backward" displacement, the springs 50 being freed.

When the engine first starts running and pump power is developed the check valve 17 is opened and piston 14 pressured downwardly against the bias of spring 14. Lever 212 is then free to rotate and free-wheeling is made possible.

The said forward displacement also operates the torque valve 666 to act as a control if automatic drive is established by valve 470.

On the other hand, if backward displacement occurs, the valve 17 is closed and cylinder 13 opened to the drain 70. Piston 14 is moved upwardly by spring 15 and piston pin 42 moves the throttle pedal 510 through link 504 and lever 544 out of F. W. position 586 and into the "throttle-just-opening" position shown in Fig. 9.

Automatic braking caused by spring engagement of the R. C. and R. B. due to a fall in pump pressure when the car is moving at a substantial speed could cause serious damage. If the transmission were in 1st or 3rd gear and the operator using free-wheel when said fall occurred, the F. C. would tend to become spring-engaged and then, with the power being developed again, the F. B. would tend to be re-applied and an indeterminate condition would result. However, the moment the engine ceases to fire and backward displacement occurs, the pedal 510 is taken out of the free-wheel position by piston 14. The flywheel effect of the casing 74 then keeps the power pump and engine turning long enough for the F. B. to become re-applied. The pump is then kept operating by torque received from the tailshaft until the transmission slows down to a point where there would no longer be any danger of damage from automatic braking.

In driving in 2nd or 4th gear the F. C. is already spring-engaged and the same difficulty does not arise.

Although not shown in Fig. 2 the power pump would, of course, be provided with the usual escape valve to regulate its maximum pressure.

Some of the features described could be satisfactorily used in conjunction with a fluid coupling or conventional clutch but the invention aims at a self-contained mechanism which provides the needed clutch effect by gear-locking. It will be apparent that this could also be performed by the rear unit if fitted with a controllable pump but for practical purposes the front pump is sufficient.

*Reversal and re-set valves.*—The function of the reversal valve is to reduce wear and strain on the F. B. by causing its application at a moment when the drum is for practical purposes stationary.

The re-set valve is required because the said reversal may take place in either direction of rotation. When the engine commences running the drum is rotated backwardly.

(a) "Starting" in 1st or 3rd gear the drum is checked by gear-locking and reverses its rotation to turn "forwardly."

(b) In "change" from 2nd or 4th into 1st or 3rd the drum that was rotating as a unit with the engine slows down when the F. C. is disengaged and then rotates "backwardly." Too rapid slowing down may be prevented by the restriction of escape line 55 as shown in Fig. 16.

Reversal also takes place in a start in 2nd or 4th or in a change into these gears but as the F. B. is being drained it is not of any moment.

The re-set valve is moved to the left by valve 380 when the engine starts running and conduit 389 is made the potentially operative one. Once however the drive is put into 2nd or 4th the pressure applied to chamber 446 is also present in chamber 251 and the valve is moved to the right again, and conduit 388 becomes ready for front brake actuation when the power comes through from 362.

The F. W. valve and the selector valve supply the trigger action for this turning on of power, whichever valve is closed being the one that will initiate the F. B. application.

The reversal and re-set valves take no part in the engagement of the F. C.

It will be evident that in using the selector valve it is better to take only one step at a time, i. e., between 1 and 2, 2 and 3, and 3rd and 4th. Gear-locking will then be operative for each change, whereas, if a jump were made from 1st to 3rd or from 2nd to 4th, the front unit would not undergo change and the rear unit would take much more wear and strain instead of being "pre-selected" while the change was occurring more slowly in the front unit.

*Up-down valve 340.*—This valve is centered by springs 347 and 348 if there is no plus pressure in chambers 349 and 350.

*Up-change (by valve 340).*—Valve 340 is moved to the "left" by pressure in chamber 349 from 369 through 332 and 353 when the speed of the car "exceeds" 50 M. P. H. and:

(a) Power line 367 is opened by slot 341 to chamber 446 to move gearlock valve 450 "up," the F. C. going "on" by drainage to 403.

(b) Slot 342 opens line 131 to the drain 305 and the R. C. becomes spring-engaged.

(c) Slot 344 opens line 351 to the drain 309 and the F. B. is "off."

(d) Slot 345 opens line 383 to the power line 358 and the R. B. becomes disengaged by pressure.

These 4 changes provide high gear regardless of the setting of the selector valve. Valve 340 also closes off line 432 so that a kick-down is provided against.

(e) The power relief line 337 is opened through slot 343 and line 493 to power line 362.

The pressure provided by "power relief" must always remain sufficient to hold the F. W. check piston 14 "down" against the bias of spring 15, otherwise it would be impossible to free-wheel in high gear if the speed is over 50 M. P. H.

*Kick-down by valve 340.*—When the throttle is fully depressed at a speed below 50 m., pressure from 366 passes through 240 and 482 to chamber 350 and the valve 340 is moved to the "right" to provide a change-down. The valve slots now register with a new series of conduits connecting valve 340 to the selector valve which may be arranged to furnish any change that may be desired. It is preferred however to make this kick-down provide a change to the next lower gear than the one that is operative when the valve 340 is centered.

*F. W. when over 50 M. P. H.*—If valve 460 is turned to the F. W. position when over 50 m.;

(a) F. B. is drained "off" by 222.

(b) Gearlock valves go downwardly, 446 being drained by 401 and the F. C. is disengaged by pressure.

(c) R. C. and R. B. remain unchanged.

(d) Power relief line 337 is drained to 402 restoring full power.

(e) Pump escape line 55 is wide open to the drain 222.

The operation of the other valves has been fully covered.

Notes on construction

Provision for the many power points is not shown in Fig. 6 but they could be suitably supplied from a cavity cast within the block 333, on similar lines to the water jacket of an engine, and then only one connection from said cavity to the pressure pump would be required. One resistance pump as described can be made to provide a smooth action but it will be evident that a second resistance pump could be fitted in connection with the rear planetary unit.

The front and rear clutches are both spring-engaged. The special advantage of this is that the engine is directly connected to the driving wheels for a push start with dead engine, and the engine acts as an additional brake in the automatic braking which occurs with absence of hydraulic pressure. It also provides another safety feature in that, even if the extra switch 522 were not used, the electric starter would not be able to swing the engine.

It will also be apparent that the automatic brake could be furnished by the reverse brake band or the front brake band acting in co-operation with two spring-engaged clutches, but this would call for radical changes in the transmission as shown.

For starting a dead engine with push or pull, or for towing, the spring-applied brake would, in any case, have to be manually freed. For towing it is also necessary, after freeing the rear brake, to manually disengage the front clutch. The escape for the resistance pump is wide open since the gearlock valves are biased downwardly.

While there has been described what at present is considered a preferred embodiment of the invention, it will be appreciated by those skilled in the art that various changes and modifications can be made therein without departing from the essence of the invention which resides in the construction, combination and arrangement of the various parts described.

The invention is intended to cover any modifications as come within the true spirit and scope of the claims which follow.

What is claimed is:

1. In a power transmission, in combination; a planetary assembly having members including a sun gear, planet gears, a planet-gear carrier and a ring gear; a drive shaft operably connected with one of said members; a driven shaft operably connected with another of said members; gears in said assembly being enclosed to form a fluid pump; an inlet and an outlet for said pump; one of said shafts being divided into a first part and a second part; spring means interposed between said parts and adapted to be compressed upon the passage of increased torque; the two said parts being movable relatively to one another in response to variations in the amount of torque transmitted; an axially movable element rotating in unison with said second part; a centrifugal mechanism operated in association with said transmission and in accordance with the speed of the transmission; a connection from said centrifugal mechanism to said element serving to axially operate said element as the said speed is varied; an opening between said element and said first part; an hydraulic connection between said pump and said opening; said opening acting as a valve to control the flow from said pump; said opening being increased as the said speed is reduced and as the torque being transmitted is increased; closure of said opening providing resistance to the rotation of the gears forming said pump, said resistance varying with the degree of said closure; the amount of said flow thus serving to determine the speed ratio in the relative rotation of said shafts.

2. A power transmission as set forth in claim 1; including a one-way mechanism in connection with the said centrifugal mechanism which renders the latter said mechanism inoperative when the transmission is providing a reverse drive.

3. A power transmission as set forth in claim 1; including clutch means operable to connect said shafts for unitary rotation; spring means biasing said clutch means to the engaged position; hydraulic mechanism in connection with said clutch means; a pump supplying fluid pressure; a third opening; said third opening being associated with said first part; a fourth opening; said fourth opening being associated with said second part; said third and fourth openings co-operating to furnish a second valve which may be conditioned to provide either drainage or fluid pressure in the control of said hydraulic mechanism; hydraulic connections from said second valve to said hydraulic mechanism and to said fluid pressure pump; said hydraulic mechanism being operated to maintain said clutch means in the engaged position when torque is being transmitted in the opposite direction, that is, from the said driven shaft to the said drive shaft; said parts, in this condition of backward torque transmission, undergoing relative rotation in the opposite direction from that which occurs when the first said spring means is being compressed.

4. In a power transmission, in combination; an engine-driven shaft, an intermediate shaft and a final driven shaft; clutch means serving to connect said engine-driven shaft and said intermediate shaft for unitary rotation; hydraulic mechanism serving to determine the engagement and disengagement of said clutch means; a pump supplying fluid pressure; spring means biasing said clutch means to engaged position; a planetary gear assembly serving to provide a direct drive and a reduced drive between said intermediate shaft and said final driven shaft; one of said shafts being divided into a first part and a second part; said parts being capable of slight relative rotation, the one to the other; an opening in association with said first part and an opening in association with said second part; said openings co-operating to form a valve; hydraulic connections from said valve to said pump and to said hydraulic mechanism; said valve being operative to provide either fluid pressure or drainage to the said hydraulic mechanism; said valve being conditioned to operate said hydraulic mechanism to maintain said clutch means in the engaged position when the said final driven shaft transmits torque in the opposite direction, that is, forwardly to the engine-driven shaft.

5. In a power transmission, in combination; a drive shaft and a driven shaft; a pump supplying fluid pressure; a planetary gear assembly serving to provide a reduced drive between said shafts; gears in said assembly being enclosed to form a fluid pump; a brake and a brake drum; said brake drum being connected to a member of said assembly; hydraulic mechanism operated by said fluid pressure in association with said brake; a first valve means serving to restrict the flow of fluid from said latter pump; and thereby to check the rotation of the gears forming said pump and to provide easier application of said brake; a second valve means, connected with said hydraulic mechanism and serving to control said mechanism for the operation of said brake; a connection from said brake drum to said second valve means; and centrifugal means serving to make the latter said connection operative when said brake drum reverses its direction of rotation.

6. A power transmission as set forth in claim 5, including an axially movable member rotating in unison with said brake drum; spring means biasing said movable member to original position; the connection between said brake drum and said second valve means being made through said movable member; the said centrifugal means serving to actuate the said movable member against said spring means when said brake drum and said movable member are rotating at appreciable speed; said second valve means being operated through said latter connection to one position when the said brake drum and the said movable member are rotating in one direction and to a second position when they are rotating in the other direction; said second valve means supplying fluid pressure to said hydraulic mechanism in the first position and drainage in the said second position.

7. A power transmission as set forth in claim 6, wherein said brake drum is fitted with a flange; said movable member being also fitted with a flange; the connection from said brake drum to said second valve means including a swinging member connected mechanically with said second valve means; said spring means serving to cause said flanges to make frictional connection with said swinging member when the said flanges change their direction of rotation; and said centrifugal mechanism serving to free said flanges from said swinging member when the speed of rotation of said flanges becomes appreciable.

8. In a power transmission in a self-propelled vehicle, in combination; a drive shaft and a driven shaft; planetary gearing connecting said shafts; clutch means and brake means serving to provide a plurality of gear ratios in the drive through said gearing; hydraulic mechanism in association with said clutch means; hydraulic mechanism in association with said brake means; a pump supplying fluid pressure; said fluid pressure serving for the operation of said hydraulic mechanisms; a gear selector valve capable of being operated to a plurality of positions by the operator of the vehicle and serving to determine the gear ratio in use; a second valve having on the one hand hydraulic connections with the said mechanisms; and on the other hand connection with the said selector valve including a first series of conduits and a second series of conduits; a third valve; an engine throttle and a connection from said throttle operating said third valve an hydraulic connection from said third valve serving for the actuation of said second valve; centrifugal mechanism in association with said driven shaft and an hydraulic connection from said centrifugal mechanism serving for the actuation of said second valve; said second valve being operable to three positions; spring means biasing said second valve to a normal intermediate position wherein it serves through said first series of conduits to provide the gear ratio as set by the said selector valve; said second valve being operated to a second position by said centrifugal mechanism when the vehicle exceeds a predetermined speed; and, acting independently of said selector valve, serving therein to engage said clutch means and release said brake means and thereby to place the transmission in direct drive; said second valve being operated to its third said position when the operator fully depresses the said throttle; and serving therein, through the said second series of conduits, to provide a lower gear ratio in the drive than that previously provided in the said intermediate position wherein the first said series of conduits had been in use.

9. A power transmission as set forth in claim 8, including; an intermediate shaft; said planetary gearing including a front gear assembly and a rear gear assembly, each having a sun gear, planet gears, a planet-gear carrier and a ring gear; said drive shaft being connected to said front ring gear; said front carrier being connected to said intermediate shaft; said clutch means including a front clutch spring-biased to engagement and released by fluid pressure and serving to connect said drive shaft to said intermediate shaft for unitary rotation, and a rear clutch, spring-biased to engagement and released by fluid pressure, and serving to lock the rear assembly gears and to connect the said intermediate shaft to said driven shaft for unitary rotation; said brake means including a front brake spring-biased to disengagement and applied by fluid pressure and serving to provide a reduced drive in said front assembly, and a rear brake spring-biased to engagement and released by fluid pressure and serving to provide a reduced drive in said rear assembly; and means to provide a reverse drive in said driven shaft.

RICHARD HENRY EBSWORTH.

References Cited in the file of this patent

UNITED STATES PATENTS

| Number | Name | Date |
|---|---|---|
| 1,619,703 | Chorlton | Mar. 1, 1927 |
| 1,895,751 | Bulow | Jan. 31, 1933 |
| 1,956,798 | Janssen | May 1, 1934 |
| 2,021,550 | Haycock | Nov. 19, 1935 |
| 2,151,892 | Brauer | Mar. 28, 1939 |
| 2,204,710 | Strout | June 18, 1940 |
| 2,214,201 | Moulder | Sept. 10, 1940 |
| 2,422,370 | Schnell | June 17, 1947 |